US 6,732,121 B1

(12) United States Patent
El-Gazzar

(10) Patent No.: US 6,732,121 B1
(45) Date of Patent: May 4, 2004

(54) METHOD FOR REDUCING REQUIRED MEMORY CAPACITY AND CREATION OF A DATABASE

(75) Inventor: Amin El-Gazzar, München (DE)

(73) Assignee: Data Square Corporation, Miami Beach, FL (US)

( * ) Notice: Subject to any disclaimer, the term of this patent is extended or adjusted under 35 U.S.C. 154(b) by 0 days.

(21) Appl. No.: 09/402,230

(22) PCT Filed: Apr. 8, 1998

(86) PCT No.: PCT/EP98/02062

§ 371 (c)(1),
(2), (4) Date: Jan. 31, 2000

(87) PCT Pub. No.: WO98/45790

PCT Pub. Date: Oct. 15, 1998

(30) Foreign Application Priority Data

Apr. 9, 1997 (DE) .................................... 197 14 719

(51) Int. Cl.[7] .............................................. G06F 17/30
(52) U.S. Cl. .............................. 707/104.1; 707/1; 707/3
(58) Field of Search ................. 382/166, 154, 382/305, 162–167; 707/1, 3, 104.1

(56) References Cited

U.S. PATENT DOCUMENTS

| 5,267,333 | A | * | 11/1993 | Aono et al. ................... 382/56 |
| 5,325,297 | A | * | 6/1994 | Bird et al. ................... 707/101 |
| 5,517,334 | A | * | 5/1996 | Morag et al. ............... 358/481 |
| 5,652,881 | A | * | 7/1997 | Takahashi et al. ........ 707/104.1 |
| 5,740,801 | A | * | 4/1998 | Branson ...................... 382/167 |
| 5,831,677 | A | * | 11/1998 | Streater ....................... 348/415 |
| 5,862,253 | A | * | 1/1999 | Schuneman et al. ......... 382/162 |
| 5,963,655 | A | * | 10/1999 | Sakurai ....................... 382/113 |
| 5,991,466 | A | * | 11/1999 | Ushiro et al. ............... 382/305 |
| 5,999,189 | A | * | 12/1999 | Kajiya et al. ............... 345/430 |
| 6,177,934 | B1 | * | 1/2001 | Sugiura et al. ............. 345/419 |
| 6,236,755 | B1 | * | 5/2001 | Kashiwazaki ............... 382/239 |

FOREIGN PATENT DOCUMENTS

| DE | 3425844 | 1/1986 | ........... G06F/15/40 |
| DE | 3908684 | 9/1990 | ......... G06F/15/402 |
| JP | 06004070 | 1/1994 | |
| JP | 07287560 | 10/1995 | |
| JP | 09091300 | 4/1997 | |

OTHER PUBLICATIONS

IBM Mar. 1998, Doc. 002073242.

* cited by examiner

*Primary Examiner*—Kim Vu
*Assistant Examiner*—Cam Y Truong
(74) *Attorney, Agent, or Firm*—Christopher & Weisberg, P.A.

(57) ABSTRACT

A method for reducing required memory capacity and creation of a database. In order to reduce the storage requirement of a database, the invention provides for, non-color information units to be stored to be assigned to the points of intersection of an at least two-dimensional raster matrix which spans a color space, individual color values being assigned to the information units located in the raster matrix and the image matrix thus formed being stored, preferably after image compression, as a database or part of a database.

8 Claims, 2 Drawing Sheets

METHOD FOR REDUCING REQUIRED MEMORY CAPACITY AND CREATION OF A DATABASE

Figure 1:
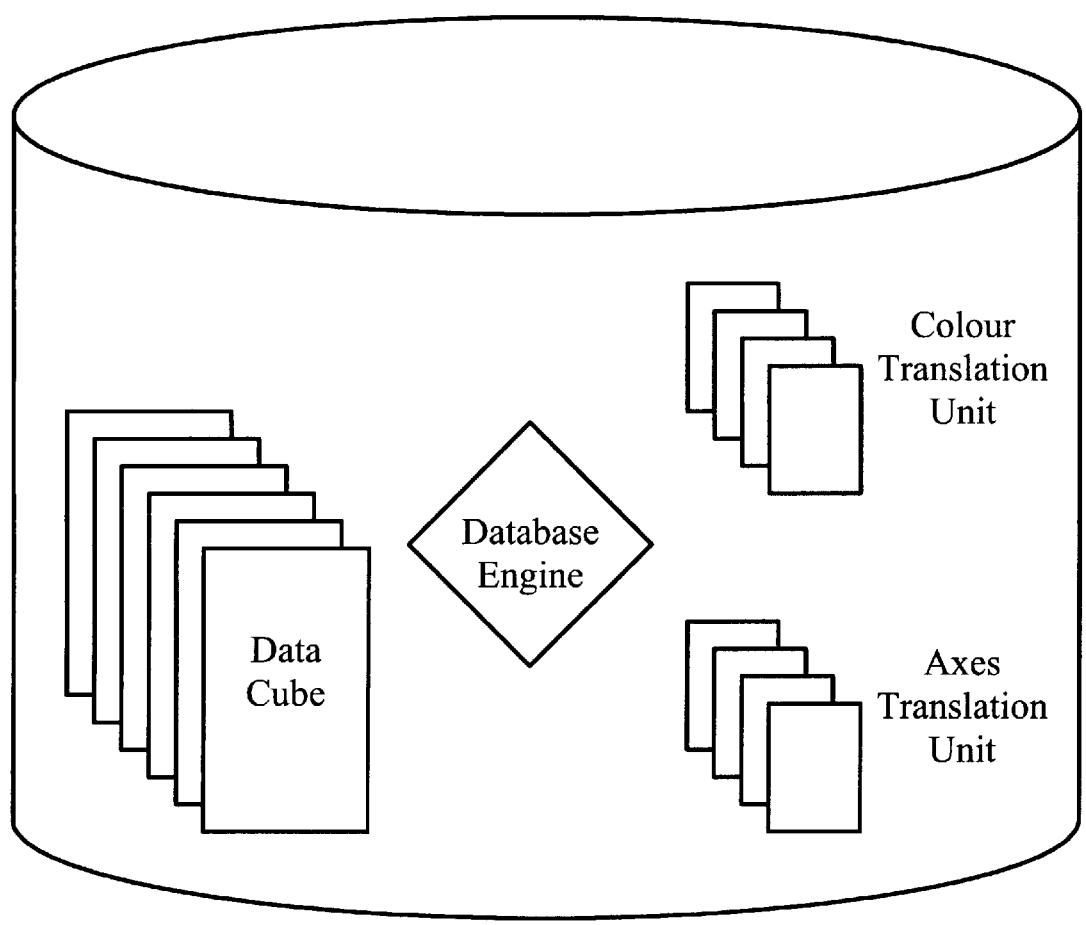

The invention relates to a method for reducing the storage requirement of a database and also an apparatus for carrying out the method.

Skilful modelling of a database is a problem particularly when very large volumes of data are involved. A concrete example is the desire or the necessity to store telephone tariff information or other individually assignable information units for any location-location combinations worldwide or at least for a relatively large country, for example Germany. The storage space available for this should be kept to a minimum. In Germany alone, however, there is already a total of 5604*5604 possible dialling code combinations. A total, therefore, of more than 30 million data records. In this case, each data record comprises at least two long-integer values of 4 bytes just for the dialling code, up to 25 bytes for the place name and at least 4 bytes for the assignment to the individual tariff zones. Each data record thus has at least 4+4+25+4=37 bytes. Consequently, the whole database would have a size of about 1.1 Gbytes, even without taking account of the so-called overhead, (indexing, etc.) of the respectively selected database. Skilful modelling of the database and classic compression technology would allow the storage requirement to be reduced to approximately 100 Mbytes. For certain database systems, which will be specified in more detail below, there is a desire to reduce the storage requirement further.

DE 34 25 844 A1 discloses a method for rapidly retrieving specific data records, produced by a telecommunications switching system or data processing system, in a data memory. The method proposes that when the data records are stored in the data memory, search terms are simultaneously stored as so-called key words in parallel therewith in a particular memory area. In the course of further processing or when the data records are printed out, whenever a key word corresponding to the search term is found, the counter position of an address counter for serial searching of the particular memory area is used to address the associated data record sought in a data memory.

Another search method for a data memory is disclosed in DE 39 08 684 A1. In this method, a finite management area, a search area located within the management area, and also search objects are predetermined in an n-dimensional co-ordinates system, the search objects which intersect the search area being determined.

These methods also permit only a slight reduction in the storage requirement.

The invention is therefore based on the object of specifying a method and an apparatus suitable for carrying out the method which enable the storage requirement to be reduced beyond the extent known to date in the case of certain databases.

The inventive method for reducing the storage requirement of a database is characterized in that information units to be stored are assigned to the points of intersection of an at least two-dimensional raster matrix, individual colour values are assigned to the information units located in the raster matrix and in that the image matrix thus formed is stored as database or as part of a database, preferably after the image matrix has been subjected to image compression.

The raster matrix is spanned by axes and information contents defined either by algorithms or by an assignment table can be assigned to the individual axis values. Suitable colour values used within the raster image matrix are, in particular, the known and defined RGB colour values, thereby enabling classic loss-free compression methods to be employed for a further considerable reduction in the storage requirement.

An inventive apparatus for carrying out the method according to the invention is characterized by the features of the claims of the present patent application with advantageous refinement possibilities in accordance with further dependent patent claims.

The invention will also be explained in more detail with reference to the appended drawing, using an exemplary embodiment.

The invention is based on the concept that any items of information can be interpreted as colour values within a multi-dimensional, for example a two-dimensional, colour space which defines an image. Complex clusters of information, e.g. databases or extensive tables, are represented as a stringing together of colour values, that is to say as images. The colour values are not strung together in an arbitrary order, but rather in the form of a multi-dimensional matrix or of a co-ordinate system, the axes being assigned their own information content. Quite apart from the reduction associated with this colour value conversion, classic loss-free image compression methods can now be applied to the images produced by the conversion.

Classic databases usually store information in tables, the columns each having their own information content but the rows being used (if at all) in an identifying manner.

On the basis of the invention, combinations of atomic or molecular information units are generated or interpreted in particular as complex colour values. For example, three ASCII characters are combined to form a colour value. In this case, the assignment of the colour values to specific character strings is defined either by an algorithm or by assignment tables which, in turn, can likewise be stored as image information.

With reference to the above example of a telephone tariff information database, the x axis of a two-dimensional colour matrix is assigned the destination locations and the y axis the originating locations, for example. A 5604*5604 matrix is thus constructed. The corresponding tariff zone is entered at the points of intersection. In addition, an index is required in which a dialling code is assigned to a matrix row and/or column. The respective tariff information is entered as a colour value into the matrix. The result is then a bitmap with a total of 5604*5604 and a colour depth of in each case 4 bytes. When stored as a bitmap, the storage requirement is still approximately 13 Mbytes. However, since a graphic is now present, classic methods for loss-free compression of graphics can be employed without any difficulty. If the PNG format is taken as a basis, for example, then ultimately a storage requirement of only approximately 650 Kbytes is still necessary for the resulting database, in conjunction with the possibility of faster access to individual data records.

Figure 2:
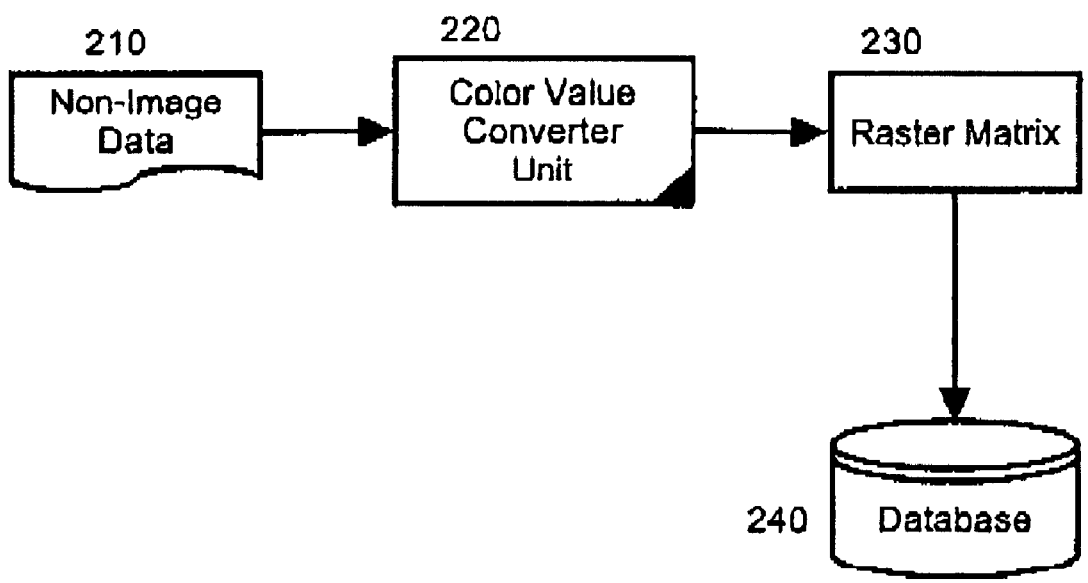

FIG. 1 illustrates the units or the structure of a database 100 with application of the method according to the invention. The invention can include a database engine 120 coupled to a data-cube 110 and a color translation unit 130 and axis translation unit 140. FIG. 2 is a block diagram which illustrates a process for reducing required memory capacity and creating a database in accordance with the database 100 of FIG. 1. Specifically, non-image data 210 can be processed in a color value converter unit 220. The color value converter unit 220 can assign the non-image data to one or more intersection points of an at leapt two-dimensional raster matrix 230. Individual color values can be assigned to the data located in the at least two-dimensional raster matrix in order to form an image matrix. Subsequently, the image matrix can be stored in a database 240.

Insofar as a multi-axis assignment is taken as a basis, an axis value assignment unit or axis translation unit ATU is provided. This ATU assigns a specific axis value to an item of atomic or molecular information or meta-information by means of an algorithm or an assignment table and also transfers the said axis value back again. Examples of meta-information that may be imagined are a pointer to a document or, in more complex cases, a "genuine" image.

Images are known to be (as a rule) two-dimensional arrangements ("distributions") of individual colour values. An image can thus also be understood as a coordinate system, two- or multi-dimensional co-ordinate systems in which individual colour values are to be located being assumed in the present context. In the case of more than two-dimensional co-ordinate systems one may also speak of colour spaces.

If a two-dimensional co-ordinate system is assumed, as an example, then the assignment rule underlying the ATU can be represented, with reference to the above example, simply as follows: "Take the integer value of a dialling code as axis value", the quantity of all the originating locations then being determined as the information space.

The ATU itself accesses, in turn, a colour value converter unit or colour translation unit CTU, which determines the assignment of specific information items to the axis values, that is to say the assignment of individual colour values to the atomic or molecular information units or meta-information units, and vice versa.

This assignment can again be made by means of algorithms or else by means of assignment tables. In this case, the following fundamental concept is applied:

As is known, colour values can be described as RGB values. In this case, an RGB value represents the component of red, green and blue by means of a respective 8-byte value for example (decimal: 0 to 255). The three individual colour values are converted into a single RGB value, for example Red=255, Green=255, Blue=255→RGB=16777215 or Red=65, Green=43, Blue=0→RGB=11073. The three individual values are then combined by bit-by-bit combination of the individual colour values to form a 24-byte colour value.

Example: 255 corresponds to 11111111. As a result, the RGB value (255, 255, 255) yields, when represented as a bit value: 11111111 11111111 11111111.

As the example illustrates, specific information items are thus "converted" into colour values, to be precise either by means of a defined assignment table for individual bit values, or by means of an assignment table for RGB values to items of atomic or molecular information or meta-information, or by means of an algorithm or an assigment table of items of atomic or molecular information or meta-information in each case to a specific red, green and blue value.

In other words, the CTU thus assigns a colour value, for example an RGB value, to an item of atomic or molecular information or meta-information. In this case, the application is not restricted to the creation of, for example, 24-byte RGB values, but rather can be applied analogously to any colour values, for example 32-byte RGB values.

This will be illustrated using a simple example for the CTU logic arrangement: "Compose a colour value from three successive ASCII values in each case".

Using this simple rule, the word "Beispieltext" ["example text"], for instance, could be represented by means of a sequence of colour values composed of four pixels:

Beispieltext→(66,101,105)(115,112,105)(101,108,116)(101,120, 116)→6907202,6910067,7629925,7632997.

If the axis value assignment unit ATU is used in conjunction with the colour value converter unit CTU, then certain axes which cannot be used in classic database systems can likewise be utilized, in a simple manner, for storing additional information.

The data or information are then actually stored in images or colour spaces in a storage bank referred to as data cube in the drawing.

As mentioned, in the case of a two-dimensional colour space (image) it is possible to employ classic loss-free compression methods in order to compress and reduce the storage requirement further. In the case of more than two-dimensional colour spaces, the latter can either be simulated by two-dimensional images or it is possible to adapt appropriate loss-free compression algorithms to multi-dimensional colour spaces.

Finally, for communication with the outside world, an interface is present which is designated as database engine and whose main task is the (buffer-) storage and retrieval of information. This interface must additionally fulfil all the essential functions of classic database systems; it therefore differs only in the form of its actual realization.

If its additional function is reduced to what is essential, then the actual difference is that the pixel values required in the context of the invention have to be read or set via the database interface in multi-dimensional colour spaces. As a rule, the elementary processing process appears as follows:

(1) The CTU converts the information units arising into colour values;

(2) the ATU (more than one of which are present, if appropriate) locates the information units (colour values) once again in their respective information spaces, and (3) the database engine sets or reads at the corresponding location the colour values determined by the CTU in the data memory (data cube).

The particular advantages of the database solution according to the invention are, primarily:

The storage space requirement is reduced considerably, for example by a factor of 100, that is to say from 100 Mbytes to 650 Kbytes, for example.

The database access is faster on account of the architecture and the smaller database sizes.

A first reduction in the storage space requirement is already achieved by the use of the colour value converter unit CTU; a further substantial reduction is achieved by the additional use of the axis value assignment unit ATU.

The method according to the invention or the described database structure with reduced storage requirement is primarily suitable wherever very large volumes of data are involved or for volume-dependent transmission costs, for example for the "video on demand", "news on demand" sectors and also for internet transmissions and the like. The additional database modelling effort required in comparison with classic database systems is worthwhile for these areas of application. Applications of interest that are currently in the foreground are worldwide routing database systems, in particular for the internet fax service, as well as the above-mentioned application for systems for tariff information and calculation via ticket machines.

What is claimed is:

1. A method for reducing the storage requirement of a database, the method comprising the steps of:

first assigning electronic data which does not represent an image to be stored to a plurality of intersection points of an at least two-dimensional raster matrix;

second assigning individual color values to said electronic data located in said at least two-dimensional raster matrix, said first and second assigning steps forming an image matrix; and, storing said formed image matrix in a database.

2. The method according to claim 1, wherein said color values comprise complex RGB color values.

3. The method according to claim 1, further comprising the step of subjecting said image matrix to an image compression process prior to storing said image matrix in said database.

4. The method according to claim 1, wherein said first assigning step comprises the step of algorithmically establishing axis values for said electronic data.

5. The method according to claim 1, wherein said first assigning step comprises the step of establishing axis values for said non-color information units with information content defined by an assignment table.

6. An apparatus for reducing the storage requirement of a database comprising:

a color value converter unit (CTU) configured to allocate electronic data which does not represent an image to defined points of intersection of a color matrix as a respective color value within a color space predetermined by said color matrix, a storage bank for storing said defined color values; and, a database engine coupled both to said CTU and to said storage bank, and configured to process requests both to store and retrieve color values allocated by said CTU to said electronic data.

7. The apparatus according to claim 6, further comprising an axis translation unit (ATU) coupled to said CTU and configured to assign electronic data to predetermined axis values of a co-ordinate system corresponding to a multi-dimensional color value matrix, said CTU assigning specific color values to said assigned axis values.

8. The apparatus according to claim 6, further comprising a loss-free compression device of said color matrix assigned to said storage bank.

* * * * *